(12) United States Patent
Hwang (10) Patent No.: US 12,292,180 B1
(45) Date of Patent: May 6, 2025

(54) OUTDOOR LAMP ASSEMBLY STRUCTURE

(71) Applicant: METROMAX AMERICA CORPORATION, Rowland Heights, CA (US)

(72) Inventor: Christina Hwang, Rowland Heights, CA (US)

(73) Assignee: METROMAX AMERICA CORPORATION, Rowland Heights, CA (US)

( * ) Notice: Subject to any disclaimer, the term of this patent is extended or adjusted under 35 U.S.C. 154(b) by 0 days.

(21) Appl. No.: 18/915,951

(22) Filed: Oct. 15, 2024

(51) Int. Cl.
*F21V 19/00* (2006.01)
*F21S 9/03* (2006.01)
*F21V 15/01* (2006.01)
*F21V 17/12* (2006.01)
*F21V 21/08* (2006.01)

(52) U.S. Cl.
CPC ............ *F21V 19/004* (2013.01); *F21S 9/037* (2013.01); *F21V 15/01* (2013.01); *F21V 17/12* (2013.01); *F21S 9/03* (2013.01); *F21V 21/0824* (2013.01)

(58) Field of Classification Search
CPC .... F21S 9/03; F21S 9/032; F21S 9/035; F21S 9/037; F21V 21/0824; F21V 19/004; F21V 15/01; F21V 17/12
See application file for complete search history.

(56) References Cited

U.S. PATENT DOCUMENTS

| 10,619,810 B1 | 4/2020 | Hwang |
| 10,995,918 B1 | 5/2021 | Hwang |
| 11,333,333 B1 | 5/2022 | Hwang |

FOREIGN PATENT DOCUMENTS

KR   100729499 B1 *  6/2007

OTHER PUBLICATIONS

Machine translation of KR 100729499 B1 retrieved from the FIT database of PE2E search. (Year: 2025).*

* cited by examiner

*Primary Examiner* — Colin J Cattanach
(74) *Attorney, Agent, or Firm* — BACON & THOMAS, PLLC (57) ABSTRACT

An outdoor lamp assembly structure includes a base, a lamp cover, and a circuit board and a battery box installed on the base. The center of the circuit board is provided with an opening, the battery box is arranged in the opening, and a multiple of elastic pressing strips has a height higher than the top plate of the circuit board and extends obliquely outward from the top plate. During assembly, the lamp cover presses downwardly against the battery box to drive the plurality of elastic pressing strips to press downwardly against the circuit board to complete the positioning of the circuit board, so as to save the assembling time and cost.

10 Claims, 8 Drawing Sheets

OUTDOOR LAMP ASSEMBLY STRUCTURE

FIELD OF THE DISCLOSURE

The present disclosure relates to an outdoor lamp assembly structure, and more particularly to an outdoor solar disc lamp pluggable into an outdoor ground or fixable to any plane, and the lamp comes with an elastic abutment design to save assembling time and costs.

BACKGROUND OF THE DISCLOSURE

In general, outdoor lamps are often used in gardens, homes, open-air restaurants or outdoor leisure venues to provide moderate lighting, create an atmosphere, and decorate the surrounding environment. Some related-art outdoor lamps are also provided with a solar panel that uses solar energy to provide the operating power and achieve the environmental protection and energy saving effects.

The outdoor lamps of this sort are generally buried in the ground and designed in a disc-shape, and its structure substantially includes a base, a lamp cover, a circuit board, wherein a battery box and a solar panel are arranged between the base and the lamp cover, and the circuit board is welded with a plurality of LEDs and electrically connected to the battery inside the battery box and the solar panel, so that the plurality of LEDs can emit light upward through the lamp cover. For example, the discloser of the present disclosure has previously filed U.S. Pat. Nos. 10,619,810, 10,995,918, and 11,333,333, which are typical examples.

In the related art, the circuit board is fixed to the base or on the lamp cover by screws, and it is necessary to have a plurality of screw holes formed on the base or the lamp cover, pass the screws through the circuit board, and lock the screws into the screw holes respectively to fix the circuit board, thus resulting in a waste of time and manpower during assembly and a lack of efficiency.

To overcome these problems, the discloser of the present disclosure based on the product functions of the outdoor lamp to conduct researches and experiment and improve the related-art outdoor lamp and finally developed an outdoor lamp assembly structure without requiring screws and screw holes to fix the circuit board of the outdoor lamp, in order to achieve the function of firmly positioning the circuit board and the effects of easy assembly and reduced production costs.

SUMMARY OF THE DISCLOSURE

Specifically, the present disclosure provides an outdoor lamp assembly structure, including:
  a base, having a top and a bottom, the top being provided with a fixed platform, and the center of the fixed platform being provided with a recessed compartment;
  a lamp cover, assembled to the upper periphery of the base, and comprising a translucent board covering the top of the fixed platform, a ring-shaped border extending downward from the periphery of the translucent board, and the ring-shaped border having a ring-shaped bottom edge abutting and fixing the periphery of the fixed platform;
  a circuit board, having an opening arranged corresponding to the compartment, and the circuit board having a top side and a bottom side, wherein the bottom side is stacked on the fixed platform, and the top side is provided with a plurality of LEDs spaced from each other and arranged around the periphery of the opening;
  a battery box, configured in the compartment for storing a battery, the battery box comprising a top plate protruding outward from the opening of the circuit board opening, the top plate having a height higher than the top side of the circuit board, and two opposite edges of the top plate being provided with at least one elastic pressing strip extending obliquely outward and downward to touch the top side of the circuit board; and
  a solar panel, configured between the translucent board of the lamp cover and the top plate of the battery box, the circuit board, the battery box and the solar panel being electrically coupled to each other, wherein when the lamp cover is assembled to the top of the base, the translucent board presses downwardly against the solar panel and the battery box to drive the elastic pressing strips on two sides of the top plate of the battery box to press downwardly against the top side of the circuit board, so that the bottom side of the circuit board is pressed and positioned on the fixed platform.

Compared with the related art, the present disclosure improves over the related-art structure that fixes the circuit board by screws and screw holes to allow the assembly of the outdoor lamp to lock and fix the circuit board without requiring screws and screw holes, and uses the elastic pressing strips on two sides of the top plate of the battery box to press the circuit board towards the fixed platform of the base for fixation, so as to achieve the effects of easy assembly and low production cost.

The objectives, technical characteristics and effects of the present disclosure will become apparent with the detailed description of preferred embodiments accompanied with the illustration of related drawings.

DESCRIPTION OF THE PREFERRED EMBODIMENTS

Figure 1:
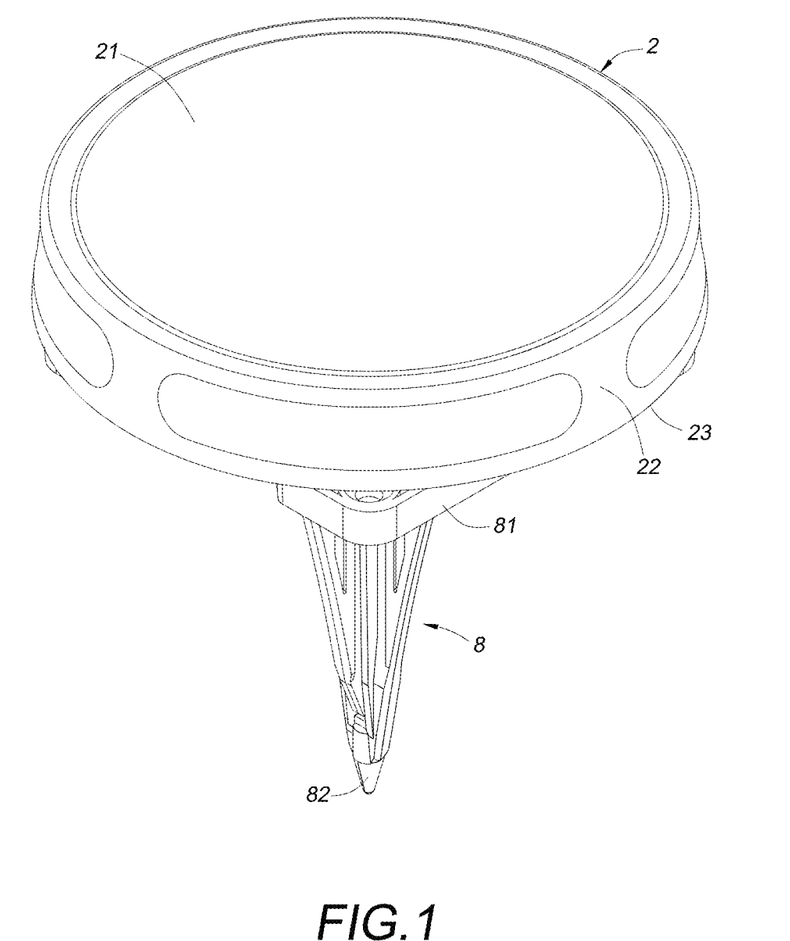
FIG. 1 is a perspective view of the present disclosure.
Figure 2:
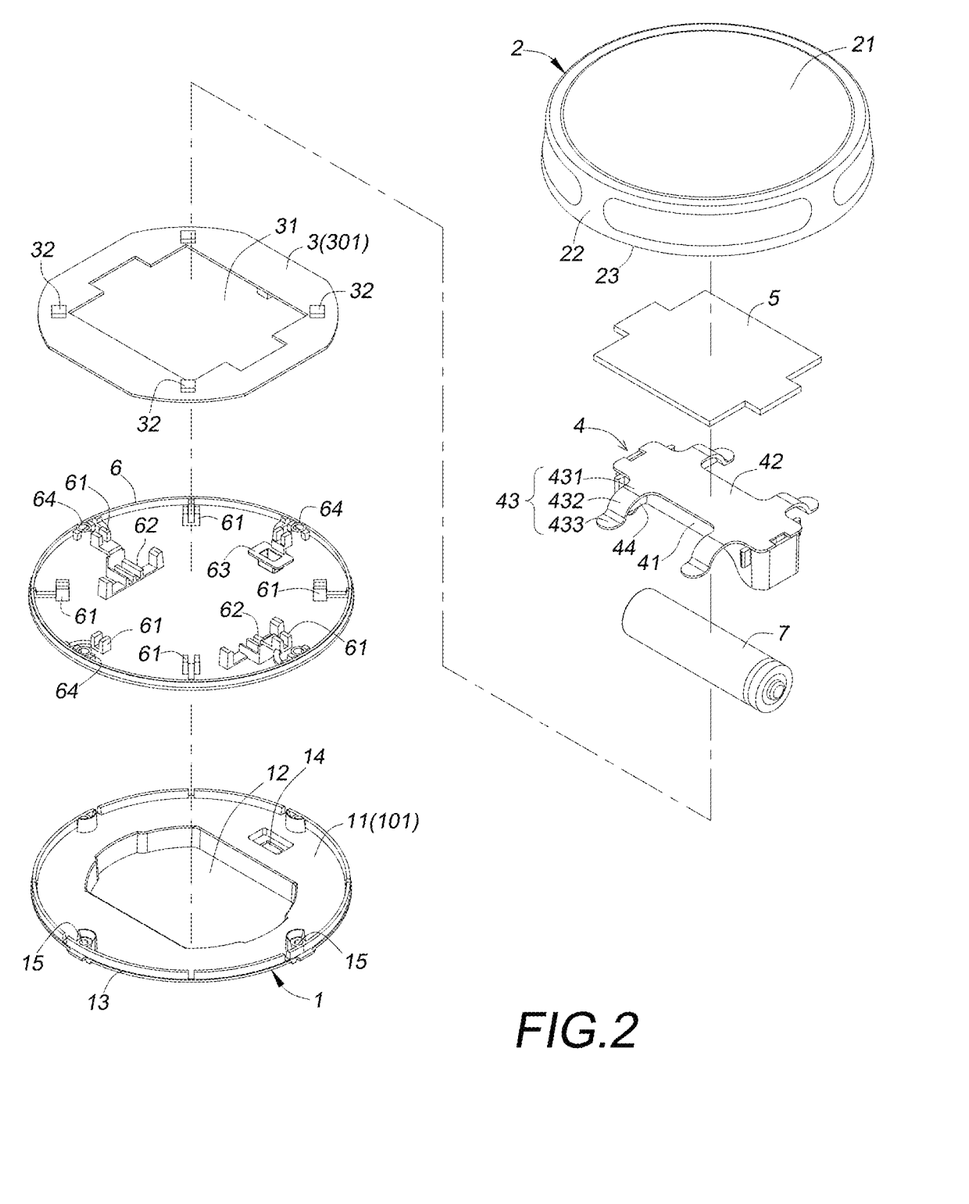
FIG. 2 is an exploded view of FIG. 1.
Figure 3:
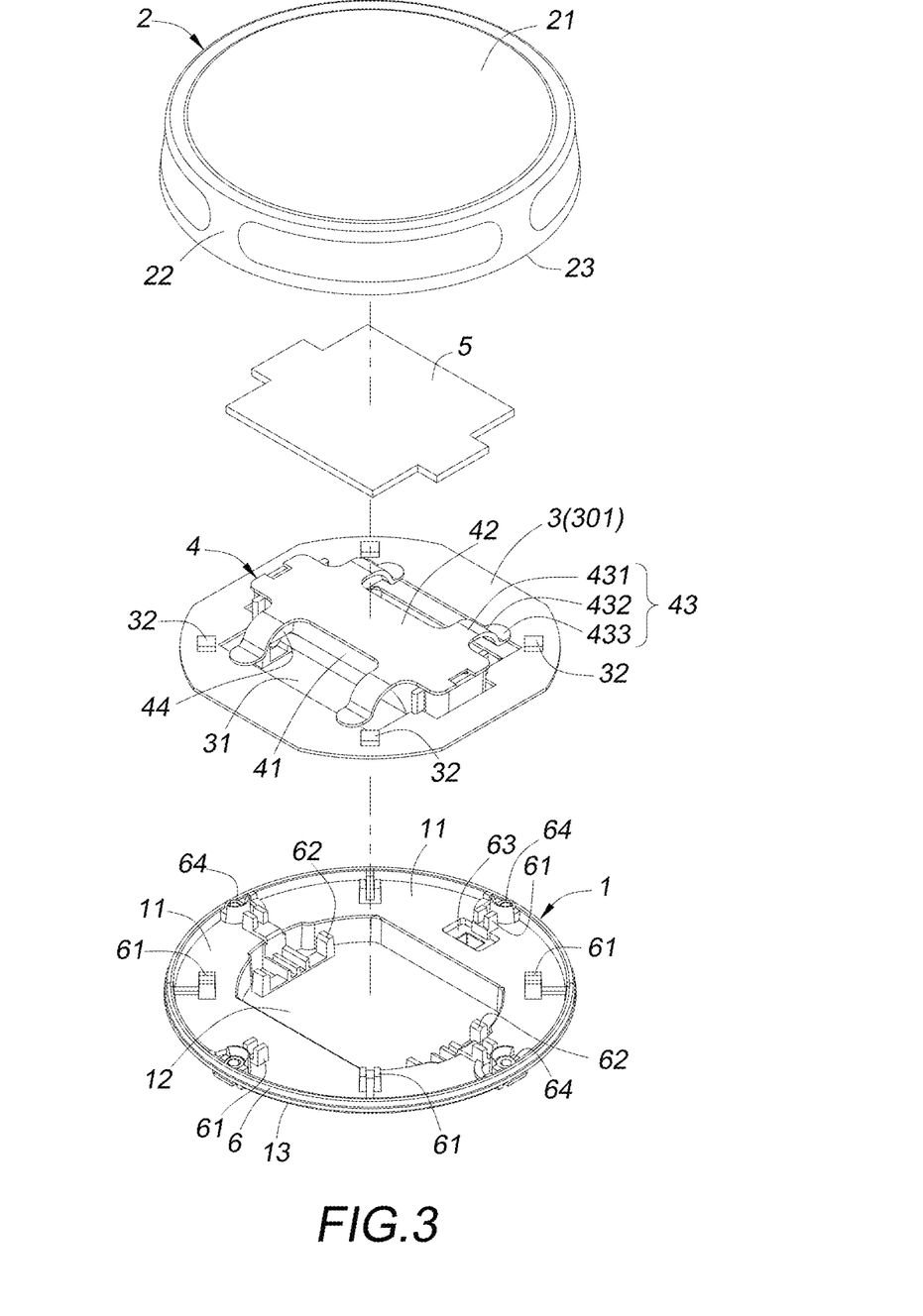
FIG. 3 is a partial exploded view of FIG. 1.

With reference to FIGS. 1 to 3 for an outdoor lamp assembly structure of the present disclosure, the outdoor lamp assembly structure includes a base 1, a lamp cover 2, a circuit board 3, a battery box 4 and a solar panel 5. The top 101 of the base 1 is provided with a fixed platform 11, the center of the fixed platform 11 is provided with a recessed compartment 12, the periphery of the fixed platform 11 is provided with a ring-shaped groove 13, and the inner periphery of the ring-shaped groove 13 is surrounded with a plastic ring 6.

In FIGS. 4 to 7, the lamp cover 2 is assembled to the periphery of the top of the base 1, the lamp cover 2 is provided with a translucent board 21 covering the top of the fixed platform 11, the periphery of the translucent board 21 is provided with a ring-shaped border 22 extending downward, the ring-shaped border 22 has a ring-shaped bottom edge 23, the ring-shaped bottom edge 23 presses against the ring-shaped groove 13 of the base 1 for fixation, such that the plastic ring 6 is pressed and fixed between the ring-shaped bottom edge 23 and the ring-shaped groove 13 to make the ring-shaped bottom edge 23 of the lamp cover 2 and the periphery of the fixed platform 11 airtight and waterproof.

The circuit board 3 is provided with an opening 31 configured to be corresponding to the compartment 12, the bottom side 302 of the circuit board 3 is stacked on the fixed platform 11, such that the circuit board 3 is disposed between the translucent board 21 and the fixed platform 11, and the top side 301 of the circuit board 3 is provided with a plurality of LEDs 32 spaced from each other and surrounding the periphery of the opening 31.

In a preferred embodiment as shown in FIGS. 2 to 7, the battery box 4 is arranged in the compartment 12 and protruding outward from the opening 31 of the circuit board 3, and the bottom of the battery box 4 is provided with a battery positioning slot 40 for installing a battery 7.

In the figures, the battery box 4 has a top plate 42 with a height higher than the top side 301 of the circuit board 3, two opposite edges of the top plate 42 are provided with at least one elastic pressing strip 43 extending obliquely outward and downward to touch the top side 301 of the circuit board 3. In this embodiment, there is a plurality of elastic pressing strips 43, and the elastic pressing strips 43 are arranged symmetrically on two sides of the top plate 42, such that the plurality of elastic pressing strips 43 is capable of abutting the circuit board 3 uniformly.

Specifically, the elastic pressing strip 43 of the present disclosure is made of a plastic material, each elastic pressing strip 43 includes an extension section 431 extending from the periphery of the top plate 42 of the battery box 4 towards the periphery of the fixed platform 11, a curved section 432 extending obliquely from an end of the extension section 431 towards the top side 301 of the circuit board 3, and a pressing contact section 433 extending from an end of the curved section 432 towards the periphery of the fixed platform 11 to touch the top side 301 of the circuit board 3.

The periphery of the top plate 42 of the battery box 4 is provided with an outer periphery wall 41 extending downward, the top plate 42 and the periphery of the outer periphery wall 41 are encircled to form the battery positioning slot 40, a rib plate 44 is provided between the outer periphery wall 41, the extension section 431 and the curved section 432 of the battery box 4, and the rib plate 44 can prevent the elastic pressing strip 43 from being bent excessively.

The solar panel 5 is configured between the translucent board 21 of the lamp cover 2 and the top plate 42 of the battery box 4, and the circuit board 3, the plurality of LEDs 32, the battery box 4, the battery 7 and the solar panel 5 are electrically coupled to each other.

Figure 4:
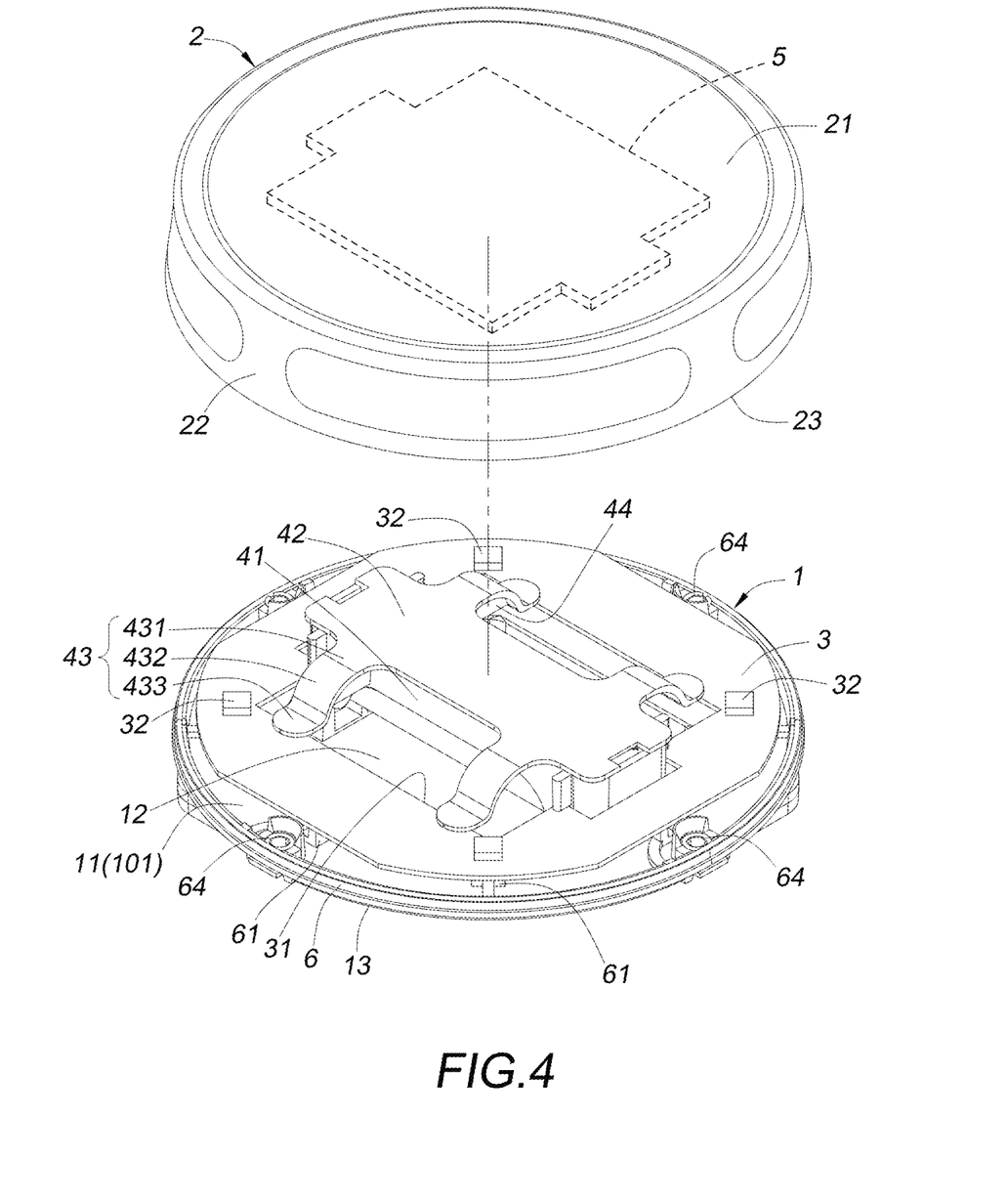
FIG. 4 is another partial exploded view of FIG. 1.
Figure 6:
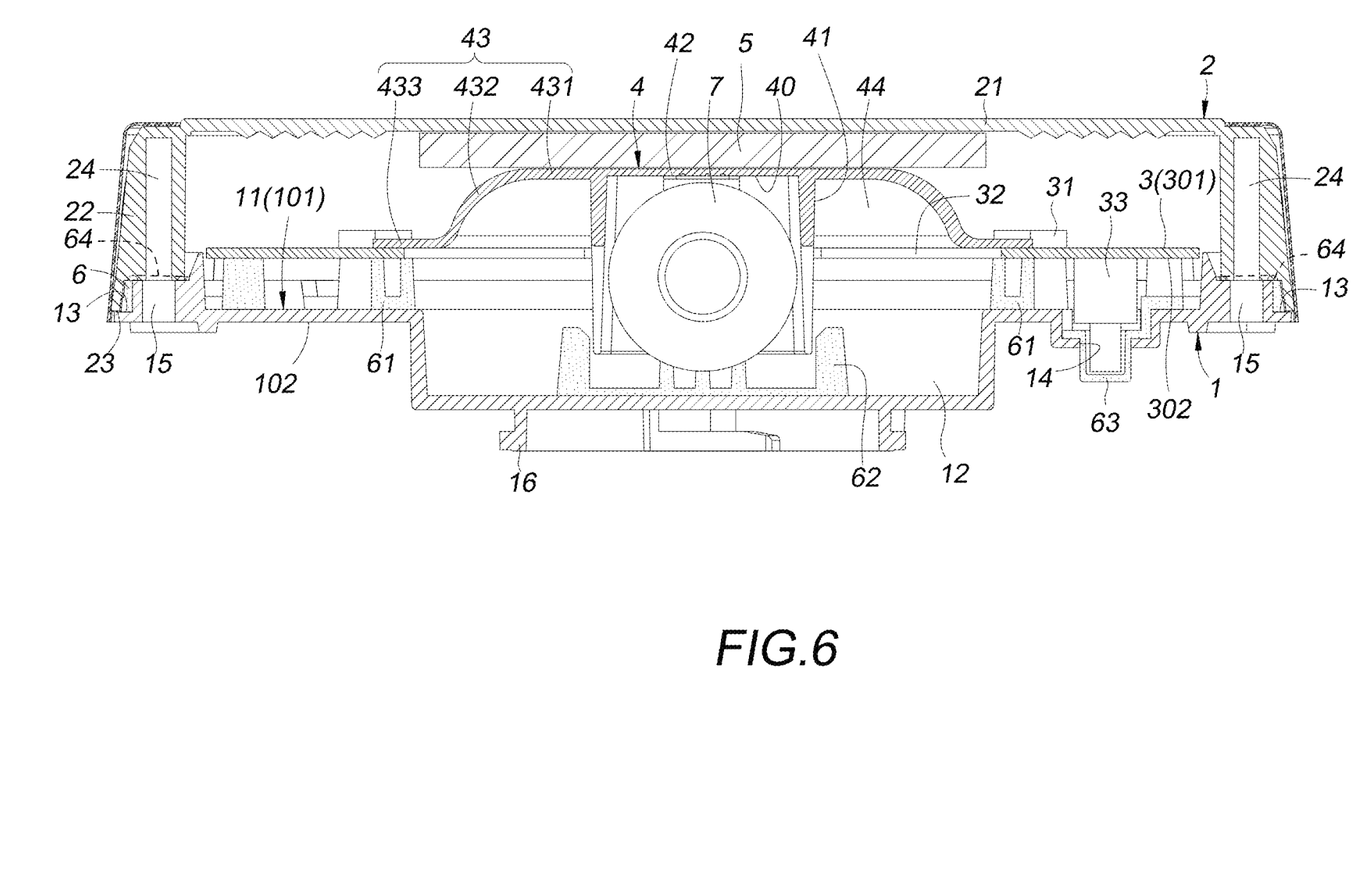
FIG. 6 is a side cross-sectional view of FIG. 1.
Figure 7:
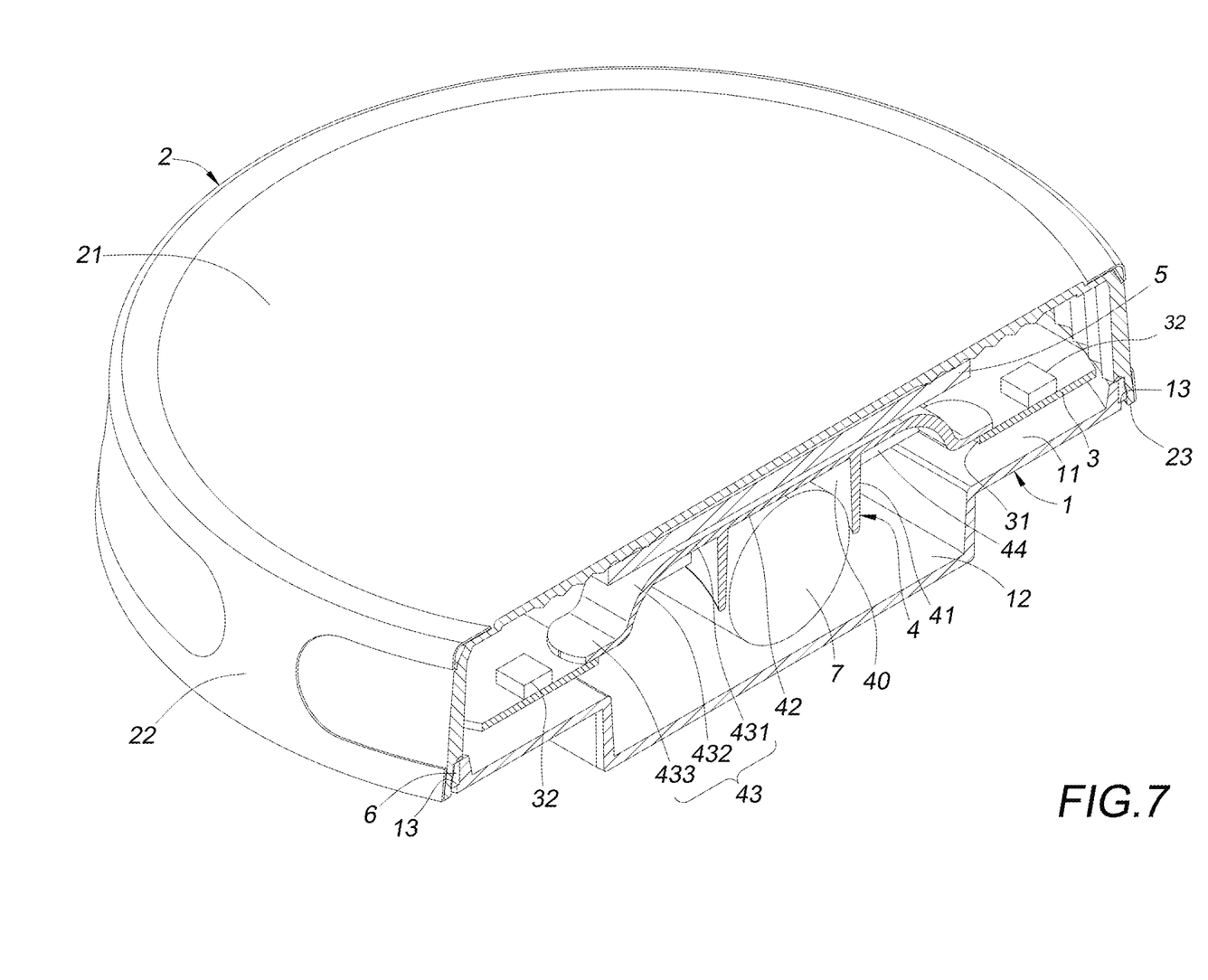
FIG. 7 is a cross-sectional view of FIG. 1.
Figure 8:
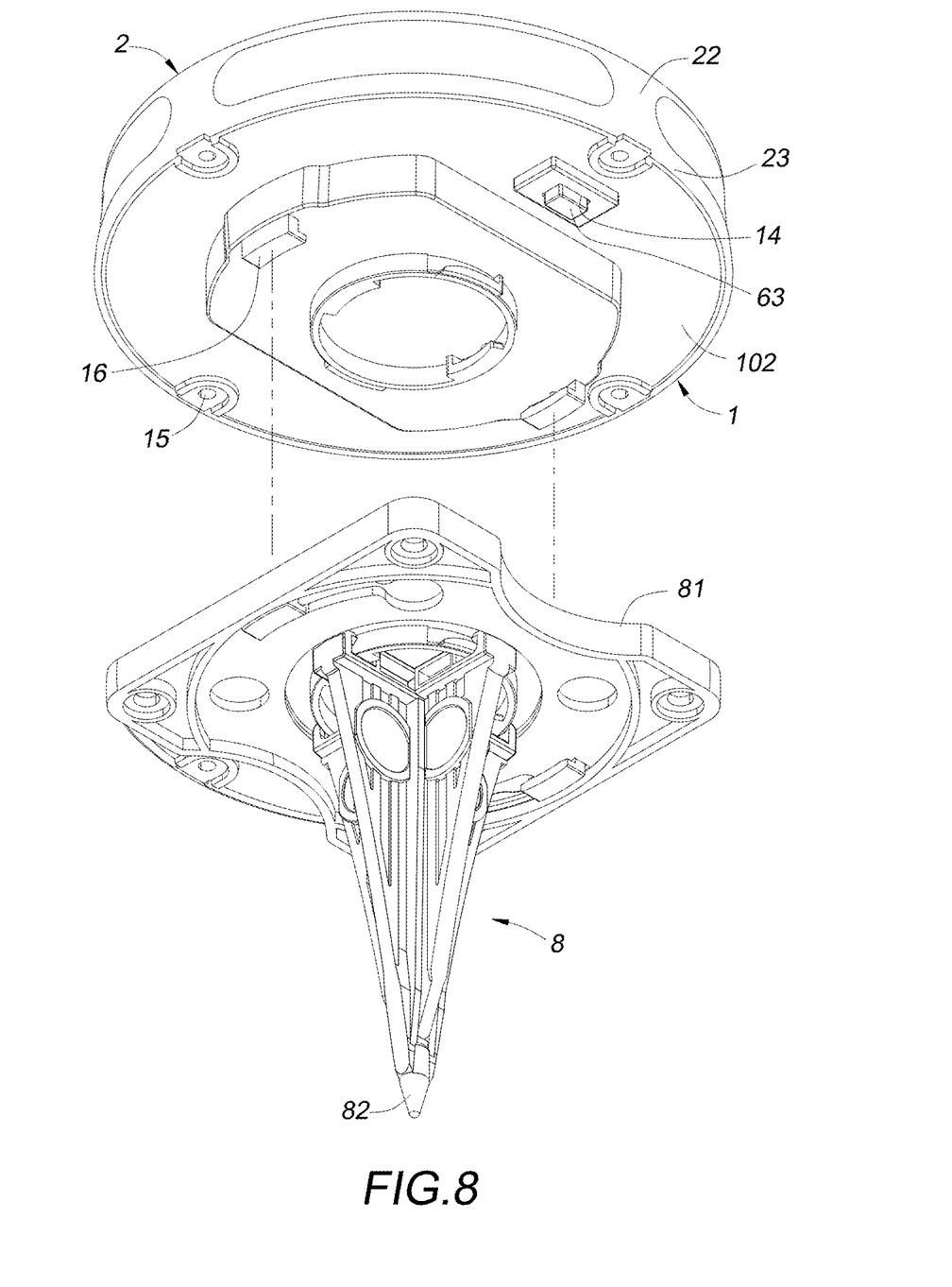
FIG. 8 is a bottom exploded view of FIG. 1.

In FIGS. 4, 6 and 7, during the assembly of the outdoor lamp, the lamp cover 2 is assembled directly to the periphery of the top of the base 1, such that the translucent board 21 of the lamp cover 2 can be pressed downward against the solar panel 5 to drive the solar panel 5 to press downward against the battery box 4 and the top plate 42, and to drive pressing contact sections 433 of the elastic pressing strip 43 on two sides of the top plate 42 of the battery box 4 to press downward against the top side 301 of the circuit board 3. As a result, the bottom side 302 of the circuit board 3 is pressed and fixed onto the fixed platform 11 of the base 1.

In FIGS. 1, 6 and 7, during use, sunlight can pass through the translucent board 21 of the lamp cover 2 to illuminate the solar panel 5, prompting the solar panel 5 to charge the battery 7, allowing the battery 7 to supply power to the circuit board 3 and the plurality of LEDs 32; and there is a distance between the plurality of LEDs 32 and the translucent board 21 of the lamp cover 2, allowing the plurality of LEDs 32 to emit light upward and sideways through the translucent board 21 and the ring-shaped border 22 of the lamp cover 2, and causing the light to scatter upward and around.

In a preferred embodiment as shown in FIGS. 2, 3, 5 and 6, the plastic ring 6 may also extend towards the center of the fixed platform 11 to form a plurality of first elastic support blocks 61, and the first elastic support block 61 can support the bottom side 302 of the circuit board 3, so that the circuit board 3 is supported and held between the elastic pressing strip 43 and the first elastic support block 61

It can be understood that through the step of assembling the lamp cover 2 on the base 1, the elastic pressing strip 43 and the first elastic support block 61 on both sides of the top plate 42 of the battery box 4 can produce a double-sided elastic clamping effect to the top side 301 and the bottom side 302 of the circuit board 3, allowing the circuit board 3 to be fixed inside the outdoor lamp, in order to save the material cost of the screws and the labor cost of locking the screws, so as to achieve the effects of easy assembly and reduce production cost.

The implementation of each element of this disclosure is further described below:

In the embodiment as shown in FIGS. 2, 3, 5 and 6, the plastic ring 6 extends towards the center of the fixed platform 11 into the compartment 12 to form a plurality of second elastic support blocks 62 for supporting the bottom of the battery box 4.

In this way, when the solar panel 5 presses downward against the top plate 42 of the battery box 4, the second elastic support block 62 can produce support elasticity under the battery box 4, so that the battery box 4 is securely clamped between the solar panel 5 and the second elastic support block 62.

Figure 5:
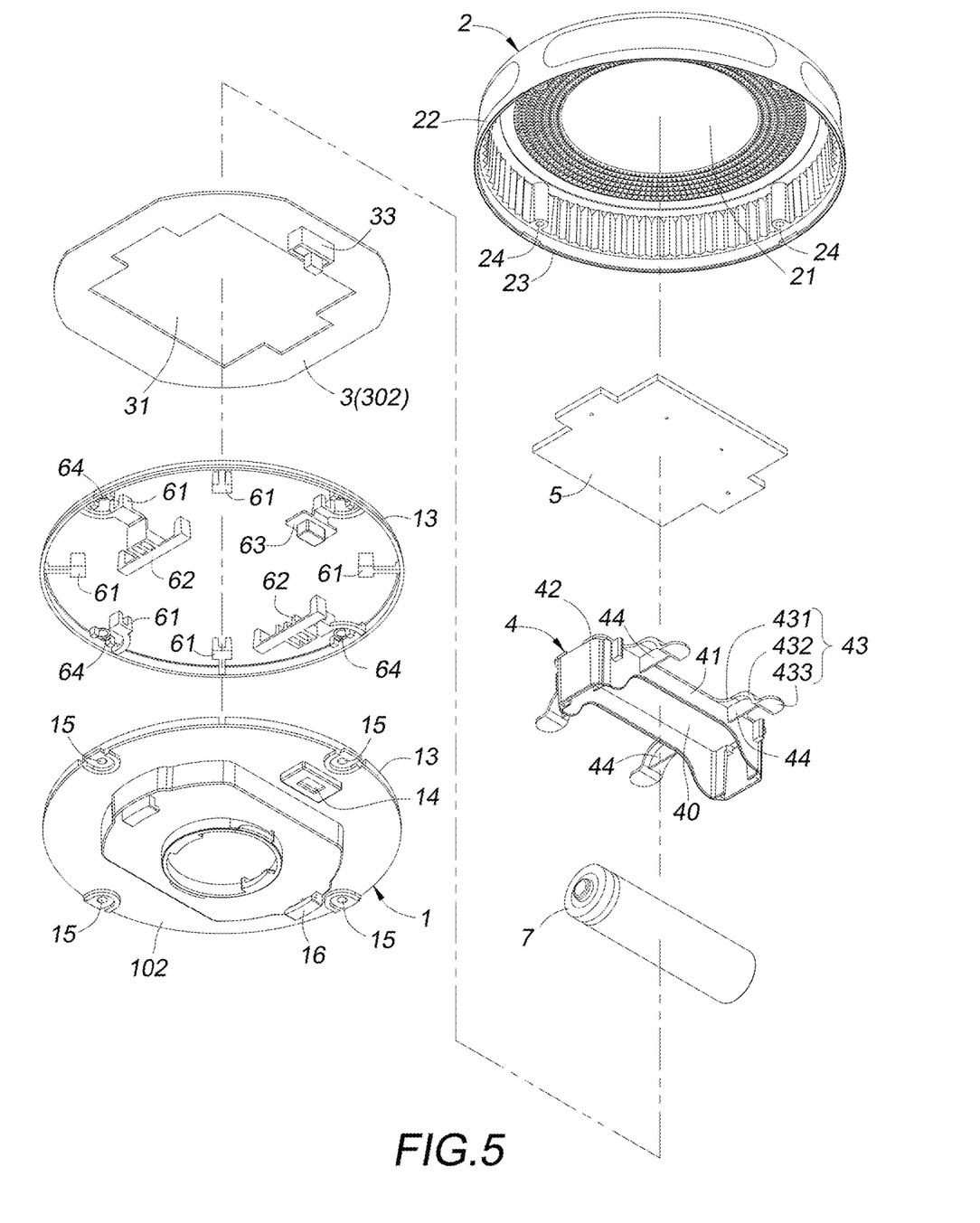
FIG. 5 is a bottom view of FIG. 2.

In an embodiment as shown in FIGS. 2, 5 and 6, the bottom 102 of the base 1 is provided with a switch fixing port 14, the switch fixing port 14 is communicated to the fixed platform 11, the circuit board 3 is electrically connected to a switch 33, and the switch 33 is fixed into the switch fixing port 14, such that the switch 33 is exposed from the bottom 102 of the base 1.

In this embodiment, the switch 33 can be directly welded to the bottom side 302 of the circuit board 3. The switch 33 is provided for the users to press or turn on/off the plurality of LEDs 32 to emit light, or switch the circuit board 3 to control the luminous effect of the plurality of LEDs 32. For example, pressing or flipping the switch 33 can switch the light to white light or make a RGB color change, providing users more choices for the lighting effect.

The plastic ring 6 extends towards the center of the fixed platform 11 to form a first waterstop sleeve 63, and the first waterstop sleeve 63 is spaced between the switch fixing port 14 and the switch 33, so as to prevent external water from entering into the outdoor lamp through the switch fixing port 14.

In an embodiment as shown in FIGS. 2, 3, 5 and 6, the bottom 102 of the base 1 is provided with a plurality of screw holes 15, the screw hole 15 is communicated to the fixed platform 11, the ring-shaped border 22 of the lamp cover 2 is also provided with a plurality of screw holes 24, the screw holes 15 of the fixed platform 11 and the screw holes 24 of the ring-shaped border 22 are configured to be corresponding to each other, and provided for passing and securing a plurality of external screws from the exterior of each screw hole 15 of the bottom 102 of the base 1 into the screw holes 24 of the corresponding ring-shaped border 22, such that the plastic ring 6 is tightly clamped between the ring-shaped bottom edge 23 of the ring-shaped border 22 and the periphery of the fixed platform 11.

The plastic ring 6 extends towards the center of the fixed platform 11 to form a second waterstop sleeve 64, the second waterstop sleeve 64 is sheathed on the screw hole 15 of the base 1, so as to prevent external water from entering into the outdoor lamp through the screw hole 15 at the bottom 102 of the base 1.

With the overall waterproof design of the plastic ring 6, first waterstop sleeve 63 and second waterstop sleeve 64, the waterproof capability of the outdoor lamp is improved. In this way, the plastic ring 6, first elastic support block 61, second elastic support block 62, first waterstop sleeve 63 and second waterstop sleeve 64 integrally formed and made of an elastic rubber material (such as rubber, silicone, etc.) can simplify the production process of the elastic compression and waterstop structure of the outdoor lamp to save costs.

In an embodiment as shown in FIGS. 1, 2, 5 and 8, the bottom 102 of the base 1 is provided with a combining part 16, and the base 1 is detachably assembled to a plug 8 through the combining part 16.

The plug 8 is in a conical shape with a wide top and a narrow bottom and having a mount 81 at the top, and a spike 82 at the bottom which is pluggable into the ground or other planes, and the mount 81 is detachably assembled to the combining part 16 at the bottom 102 of the outdoor lamp base 1. For example, the combining part 16 and the mount 81 can be assembled to each other by the concave-convex structure, so that the outdoor lamp can be fixed to the ground or other planes by the plug 8.

While the present disclosure has been described by means of specific embodiments which are to be considered illustrative rather than restrictive, numerous modifications and variations could be made thereto by those skilled in the art without departing from the scope and spirit of the disclosure as set forth in the claims.

What is claimed is:

1. An outdoor lamp assembly structure, comprising: a base, having a top and a bottom, the top being provided with a fixed platform, and a center of the fixed platform being provided with a recessed compartment; a lamp cover, assembled to an upper periphery of the base, and comprising a translucent board covering a top of the fixed platform, a ring-shaped border extending downward from a periphery of the translucent board, and the ring-shaped border having a ring-shaped bottom edge abutting and fixing a periphery of the fixed platform; a circuit board, having an opening arranged corresponding to the recessed compartment, and the circuit board having a top side and a bottom side, wherein the bottom side is stacked on the fixed platform, and the top side is provided with a plurality of LEDs spaced from each other and arranged around a periphery of the opening; a battery box, configured in the recessed compartment for storing a battery, the battery box comprising a top plate protruding outward from the opening of the circuit board, the top plate having a height higher than the top side of the circuit board, and two opposite edges of the top plate being provided with at least one elastic pressing strip extending obliquely outward and down ward to touch the top side of the circuit board; and a solar panel, configured between the translucent board of the lamp cover and the top plate of the battery box; the circuit board, the battery box and the solar panel being electrically coupled to each other; wherein when the lamp cover is assembled to the top of the base, the translucent board presses downwardly against the solar panel and the battery box to drive the elastic pressing strips on two sides of the top plate of the battery box to press downwardly against the top side of the circuit board, so that the bottom side of the circuit board is pressed and positioned on the fixed platform.

2. The outdoor lamp assembly structure according to claim 1, wherein at least one of the elastic pressing strips comprises an extension section extending from an edge of the top plate of the battery box to the periphery of the fixed platform, a curved section extending obliquely from an end of the extension section to the circuit board top side, and a pressing contact section extending from an end of the curved section to the periphery of the fixed platform to touch the top side of the circuit board.

3. The outdoor lamp assembly structure according to claim 2, further comprising an outer periphery wall extending downward from a periphery of the top plate of the battery box, a battery positioning slot formed and surrounded by the top plate and the outer periphery wall, and a rib plate installed between the outer periphery wall, the extension section and the curved section of the battery box for preventing the elastic pressing strip from being bent excessively.

4. The outdoor lamp assembly structure according to claim 2, wherein there is a plurality of elastic pressing strips arranged on the two opposite edges of the top plate respectively and configured symmetrically with each other on the two sides of the top plate, such that the plurality of elastic pressing strips can press on the circuit board uniformly.

5. The outdoor lamp assembly structure according to claim 1, wherein the periphery of the fixed platform is provided with a ring-shaped groove, an inner periphery of the ring-shaped groove is surrounded with a plastic ring, the ring-shaped bottom edge of the lamp cover is pressed and fixed to the ring-shaped groove, such that the plastic ring is pressed and fixed between the ring-shaped bottom edge and the ring-shaped groove.

6. The outdoor lamp assembly structure according to claim 5, wherein the plastic ring extends towards the center of the fixed platform to form a plurality of first elastic support blocks for supporting the bottom side of the circuit board, such that the circuit board is held between the elastic pressing strips of the battery box and the first elastic support blocks.

7. The outdoor lamp assembly structure according to claim 5, wherein the plastic ring extends into the recessed compartment at the center of the fixed platform to form a plurality of second elastic support blocks for supporting the bottom of the battery box.

8. The outdoor lamp assembly structure according to claim 5, wherein the base bottom is provided with a switch fixing port, the switch fixing port is communicated to the fixed platform, the circuit board is electrically coupled to a switch, the switch is fixed in the switch fixing port, and the plastic ring extends towards the center of the fixed platform to form a first waterstop sleeve spaced between the switch fixing port and the switch.

9. The outdoor lamp assembly structure according to claim 5, wherein the base bottom is provided with a plurality of screw holes, the screw holes are communicated to the fixed platform, and the plastic ring extends towards the center of the fixed platform to form at least one second waterstop sleeve sheathed on at least one of the plurality of the screw holes.

10. The outdoor lamp assembly structure according to claim 5, wherein the bottom of the base is provided with a combining part, and the base is detachably assembled to a plug through the combining part.

* * * * *